(12) United States Patent
Giusti et al.

(10) Patent No.: US 12,552,660 B2
(45) Date of Patent: Feb. 17, 2026

(54) MICRO-ELECTRO-MECHANICAL DEVICE FOR TRANSDUCING HIGH-FREQUENCY ACOUSTIC WAVES IN A PROPAGATION MEDIUM AND MANUFACTURING PROCESS THEREOF

(71) Applicant: STMICROELECTRONICS S.r.l., Agrate Brianza (IT)

(72) Inventors: Domenico Giusti, Caponago (IT); Fabio Quaglia, Pizzale (IT); Carlo Luigi Prelini, Seveso (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 797 days.

(21) Appl. No.: 17/966,344

(22) Filed: Oct. 14, 2022

(65) Prior Publication Data
US 2023/0129720 A1  Apr. 27, 2023

(30) Foreign Application Priority Data
Oct. 26, 2021  (IT) .................. 102021000027425

(51) Int. Cl.
*H10N 30/20* (2023.01)
*B81B 3/00* (2006.01)
(Continued)

(52) U.S. Cl.
CPC ........ *B81B 3/0021* (2013.01); *B81C 1/00158* (2013.01); *H10N 30/2047* (2023.02);
(Continued)

(58) Field of Classification Search
CPC ............ B81C 1/00158; H10N 30/2047; B81B 2203/0127; B81B 2203/0315; G01L 9/0045; G01L 9/0047; B06B 1/0625
See application file for complete search history.

(56) References Cited

U.S. PATENT DOCUMENTS

| 5,242,863 A | 9/1993 | Xiang-Zheng et al. |
| 6,775,388 B1 * | 8/2004 | Pompei ................. B06B 1/0292 367/181 |

(Continued)

FOREIGN PATENT DOCUMENTS

| CN | 111212370 A | * | 5/2020 | ............. H04R 31/00 |
| CN | 211063784 U | * | 7/2020 | ............. H04R 31/00 |

(Continued)

OTHER PUBLICATIONS

Eovino et al., "Concentric PMUT Arrays for Focused Ultrasound and High Intensity Applications," *2019 IEEE 32nd International Conference on Micro Electro Mechanical Systems (MEMS)*, Seoul, Korea, Jan. 27-31, 2019, pp. 771-774.

(Continued)

*Primary Examiner* — Pedro J Cuevas
(74) *Attorney, Agent, or Firm* — Seed IP Law Group LLP (57) ABSTRACT

PMUT acoustic transducer formed in a body of semiconductor material having a face and accommodating a plurality of first buried cavities, having an annular shape, arranged concentrically with each other and extending at a distance from the face of the body. The first buried cavities delimit from below a plurality of first membranes formed by the body so that each first membrane extends between a respective first buried cavity of the plurality of first buried cavities and the face of the body. A plurality of piezoelectric elements extend on the face of the body, each piezoelectric element extending above a respective first membrane of the plurality of first membranes. The first membranes have different widths, variable between a minimum value and a maximum value.

20 Claims, 7 Drawing Sheets

(51) Int. Cl.
  *B81C 1/00* (2006.01)
  *H10N 30/87* (2023.01)
(52) U.S. Cl.
  CPC .... *H10N 30/871* (2023.02); *B81B 2201/0257* (2013.01); *B81B 2203/0127* (2013.01); *B81B 2203/0315* (2013.01); *B81B 2203/04* (2013.01)

(56) References Cited

U.S. PATENT DOCUMENTS

| | | | | |
|---|---|---|---|---|
| 7,306,966 | B2* | 12/2007 | Benzel | G01L 9/0042 216/2 |
| 8,173,513 | B2* | 5/2012 | Villa | G01L 9/0073 257/E21.573 |
| 8,607,638 | B2* | 12/2013 | Jeung | G01P 15/14 73/754 |
| 8,831,248 | B2* | 9/2014 | Mellow | H03F 3/2173 381/186 |
| 11,807,519 | B2* | 11/2023 | Giusti | H10N 30/01 |
| 11,865,581 | B2* | 1/2024 | Gattere | B81B 7/0016 |
| 12,058,938 | B2* | 8/2024 | Bevilacqua | H10N 30/8554 |
| 2004/0266050 | A1* | 12/2004 | Benzel | B81C 1/00182 438/53 |
| 2005/0208696 | A1* | 9/2005 | Villa | G01L 9/0045 438/53 |
| 2007/0257766 | A1* | 11/2007 | Richards | F28D 15/06 62/3.1 |
| 2010/0330721 | A1* | 12/2010 | Barlocchi | B01L 3/502707 438/49 |
| 2012/0033834 | A1* | 2/2012 | Mellow | H03F 3/2173 381/396 |
| 2013/0068022 | A1* | 3/2013 | Jeung | G01P 15/14 73/702 |
| 2017/0021391 | A1* | 1/2017 | Guedes | B06B 1/0603 |
| 2018/0178251 | A1 | 6/2018 | Foncellino et al. | |
| 2020/0156114 | A1* | 5/2020 | Gattere | B06B 1/0651 |
| 2020/0236470 | A1 | 7/2020 | Cerini et al. | |
| 2021/0395075 | A1* | 12/2021 | Giusti | F16F 15/007 |
| 2022/0267141 | A1* | 8/2022 | Chen | B81B 3/0051 |
| 2023/0070307 | A1* | 3/2023 | Giusti | B81B 3/0078 |
| 2024/0034618 | A1* | 2/2024 | Giusti | B81B 7/0016 |
| 2024/0343557 | A1* | 10/2024 | Reinmuth | B81B 3/007 |

FOREIGN PATENT DOCUMENTS

| | | | | |
|---|---|---|---|---|
| CN | 111212370 | B * | 6/2022 | B06B 1/0666 |
| CN | 219540856 | U * | 8/2023 | B06B 1/0625 |
| CN | 118828325 | A * | 10/2024 | B81B 3/007 |
| DE | 102023203463 | A1 * | 10/2024 | B81B 3/007 |
| EP | 3656478 | A1 * | 5/2020 | B81C 1/00825 |
| EP | 3656478 | B1 * | 6/2023 | B06B 1/0681 |
| JP | 2023522132 | A * | 5/2023 | H04R 17/005 |
| WO | WO 2021132074 | A1 | 7/2021 | |
| WO | WO 2021209816 | A1 | 10/2021 | |

OTHER PUBLICATIONS

Tseng et al., "Phased Array Focusing for Acoustic Wireless Power Transfer," *IEEE Transactions on Ultrasonics, Ferroelectrics, and Frequency Control* 65(1):39-49, Jan. 2018.

Wang et al., "Coupled Piezoelectric Micromachined Ultrasonic Transducers with Improved Pulse-Echo Performance," *2017 IEEE 30th International Conference on Micro Electro Mechanical Systems (MEMS)*, Las Vegas, NV, USA, Jan. 22-26, 2017, pp. 151-154.

Wang et al., "Enhancement of the Transmission of Piezoelectric Micromachined Ultrasonic Transducer With an Isolation Trench," *Journal of Microelectromechanical Systems* 25(4):691-700, Aug. 2016.

Xu et al., "Coupled Piezoelectric Micromachined Ultrasonic Transducers Array with High Ultrasonic Emission Performance," *13th Annual IEEE International Conference on Nano/Micro Engineered and Molecular Systems (NEMS)*, Singapore, Apr. 22-26, 2018, pp. 151-154.

* cited by examiner

MICRO-ELECTRO-MECHANICAL DEVICE FOR TRANSDUCING HIGH-FREQUENCY ACOUSTIC WAVES IN A PROPAGATION MEDIUM AND MANUFACTURING PROCESS THEREOF

BACKGROUND

Technical Field

The present disclosure relates to a micro-electro-mechanical device for transducing acoustic waves in a propagation medium and to the manufacturing process thereof. In particular, the disclosure refers to a PMUT ("Piezoelectric Micromachined Ultrasonic Transducer") ultrasonic transducer for high intensity focused ultrasound (HIFU) applications.

Description of the Related Art

As known, ultrasonic transducers are devices capable of emitting and receiving acoustic waves (in particular, ultrasounds at a frequency comprised between 20 kHz and 100 MHz) in fluid (liquid or gaseous) and/or solid propagation media, by converting electro-mechanical, acoustic or light energy.

In particular, MUT ("Micromachined Ultrasonic Transducers") semiconductor ultrasonic transducers are known that are manufactured using silicon bulk micromachining and/or surface micromachining processes. The MUT transducers comprise membranes capable of vibrating in both acoustic waves transmission condition and acoustic waves reception condition; currently, the membrane vibrational operation is based on piezoelectric effects (piezoelectric MUTs, PMUTs) or electrostatic effects (capacitive MUTs, CMUTs).

The efficiency of the emitted/received energy electroacoustic conversion, the frequency response gain and the bandwidth are identification parameters of the MUTs. They depend both on factors typical of the MUTs (such as geometric structure and materials of the transducers, which determine a mechanical impedance of the MUT) and on factors typical of the acoustic wave propagation media (such as density of the propagation media and speed of conveyed sound, which determine an acoustic impedance thereof).

Different air ultrasonic applications are known, such as distance measure and object and environment imaging, based on the detection of the pulse echo, i.e., on the transmission of acoustic waves (e.g., of an ultrasonic pulse) and on the reception of ultrasonic echoes generated by the reflection and diffusion of the acoustic waves in the environment. The spatial distribution and harmonic content of ultrasonic echoes are caused by density variations in the propagation medium, and are indicative of objects and/or inhomogeneities present therein.

In this application, the usable frequencies also depend on the dimensions of the objects or on their characteristics; in particular, for the detection of objects having very small dimensions (e.g., up to 30 µm), very high-frequency acoustic waves are to be used, e.g., of the order of MHz.

Another example of air ultrasonic application is ultrasonic communication, which involves transmitting and receiving a modulated signal through an acoustic channel. In this application, the bandwidth directly affects the measurement resolution (pulse echo detection) or data transmission/reception (ultrasonic communication).

Another possible ultrasonic application is the minimally invasive treatment of patient tissues, where focused ultrasonic waves are used for the ablation of tissues, which are destroyed due to high heat. In this case, high-power ultrasonic waves are focused towards a target point, so as to obtain a rise in temperature up to 70-80° C.

BRIEF SUMMARY

Starting therefrom, it is desirable to manufacture piezoelectric micromachined ultrasonic devices that may work both in air and in aqueous environment, with high detection accuracy, even at much greater distances than the wavelengths used, in various fields of application, in a flexible manner.

The present disclosure provides a piezoelectric micromachined ultrasonic device that meets the indicated requirements.

According to the present disclosure, a PMUT ultrasonic transducer and the manufacturing process thereof are provided, as defined in the attached claims.

For example, in at least one embodiment, a PMUT acoustic transducer may include: a body of semiconductor material having a face; a plurality of first buried cavities, having an annular shape, arranged concentrically to each other and extending at a distance from the face of the body; a plurality of first membranes formed by the body, each first membrane extending between a respective first buried cavity of the plurality of first buried cavities and the face of the body; a plurality of piezoelectric elements on the face of the body, each piezoelectric element extending above a respective first membrane of the plurality of first membranes; wherein the first membranes have different widths.

BRIEF DESCRIPTION OF THE SEVERAL VIEWS OF THE DRAWINGS

For a better understanding of the present disclosure, some embodiments thereof are now described, purely by way of non-limiting example, with reference to the attached drawings, wherein.

DETAILED DESCRIPTION

In the article "Phased Array Focusing for Acoustic Wireless Power Transfer" by Victor Far-Guoo Tsemg, Sarah S. Bedair IEEE TRANSACTIONS ON ULTRASONIC FERROELECTRICS, AND FREQUENCY CONTROL, VOL. 65, NO. 1, January 2018 it is emphasized that wireless power transfer (WPT) through acoustic waves may achieve higher efficiencies than inductive coupling when the distance exceeds the dimension of the transducer by several times. This document teaches that arrays of ultrasonic phased elements have high power concentration on the receivers and allow the efficiency of power transfer to be increased.

The article "CONCENTRIC PMUT ARRAYS FOR FOCUSED ULTRASOUND AND HIGH INTENSITY APPLICATIONS" by Benjamin E. Eovino, Yue Liang and Liwei Lin, MEMS 2019, Seoul, Korea, 27-31 Jan. 2019, 978-1-7181-1610-5/19, IEEE, describes a PMUT device formed by an array of piezoelectric micromachined ultrasonic transducers (PMUTs) having the shape of concentric rings and demonstrates how this configuration allows manufacturing of miniaturized devices capable of generating very high acoustic and high focused intensities.

The following description refers to the arrangement shown; consequently, expressions such as "above," "below," "top," "bottom," "right," "left" relate to the attached figures and are not to be intended in a limiting manner.

The present disclosure originates from inventors' research performed on PMUT ultrasonic transducers with concentric ring structure.

Figure 1:
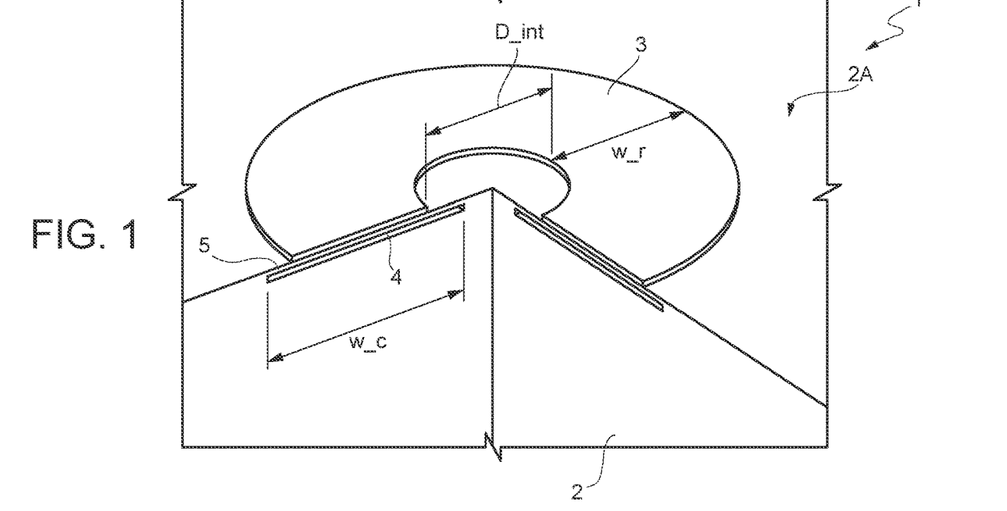
FIG. 1 is a top perspective view, partially interrupted, of a PMUT acoustic transducer with annular shape.

To this end, reference is made to FIG. 1 showing a test structure 1 formed in a body 2 of semiconductor material, here monocrystalline silicon.

The body 2 has a face 2A having a piezoelectric element 3, of annular-shape, deposited thereon, and accommodates a cavity 4, also of annular-shape and underlying the piezoelectric element 3.

The cavity 4 has an internal diameter $D\_int$ and a width $w\_c$; the piezoelectric element 3 has a width $w\_r$, smaller than the width $w\_c$ of the cavity 3.

In practice, the body 2 defines a membrane 5 overlying the cavity 4 and carrying the piezoelectric element 3.

In the inventors' studies, it has been noted that the resonance frequency of the test structure 1 of FIG. 1, in a first approximation, is substantially independent of the internal diameter $D\_int$ of the cavity 4 and mainly depends on the width $w\_c$ of the cavity 3.

Figure 2:
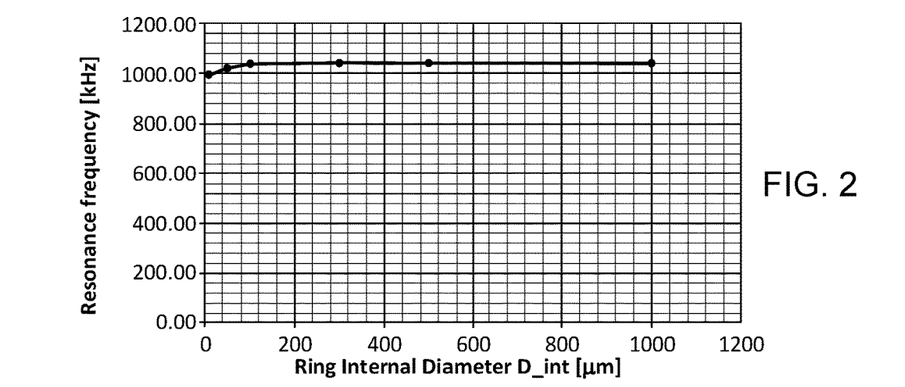
FIG. 2 is a graph showing the resonance trend as a function of the internal diameter of the annular structure of the transducer of FIG. 1.
Figure 3:
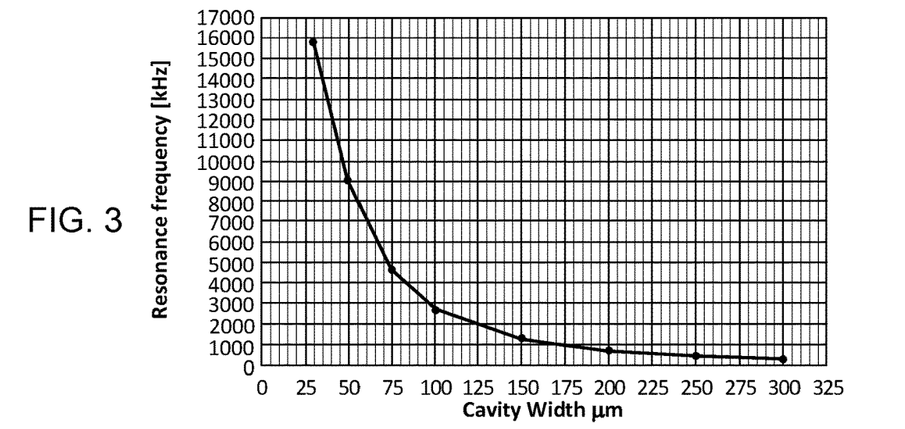
FIG. 3 is a graph showing the resonance trend as a function of the cavity width of the annular structure of the transducer of FIG. 1.

These data are shown in FIGS. 2 and 3.

In particular, FIG. 2 shows the substantial invariability of the resonance frequency from the internal diameter $D\_int$ of the cavity 4 in test structures having a constant width $w\_c$ of the cavity 4, here equal to 167 μm, and different internal diameter $D\_int$ of the cavity 3.

FIG. 3 instead shows that the resonance frequency strongly depends on the width $w\_c$ of the cavity 3, in test structures having a constant internal diameter $D\_int$ (here equal to 300 μm) and different widths $w\_c$ of the cavity 3.

The inventors' studies have also highlighted that the acoustic pressure measured on the surface (in proximity to the face 2A of the body 2) significantly depends on the width $w\_c$ of the cavity 4 and, to a lesser extent, on the internal diameter $D\_int$.

Taking into account the above, the present disclosure includes an acoustic transducer capable of emitting and detecting multi-frequency acoustic waves, as discussed hereinbelow with reference to FIGS. 4-9.

FIGS. 4-9 show an acoustic transducer 10 of PMUT type having concentric rings.

Figure 4:
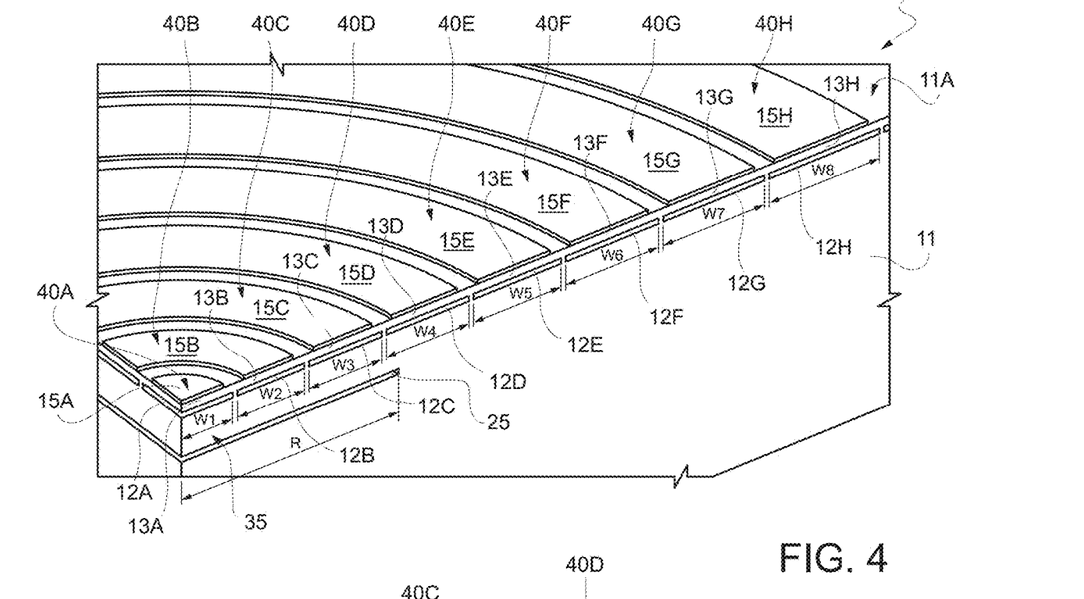
FIG. 4 is a top perspective view of a portion of a PMUT acoustic transducer, according to an embodiment.

In detail, the acoustic transducer 10 comprises a body 11 of semiconductor material, such as silicon, for example with a monocrystalline structure, having a face 12A.

The body 11 accommodates a plurality of concentric buried cavities 12A-12H; of these, the concentric buried cavity 12A arranged in a central position (hereinafter also referred to as central buried cavity 12A) has a circular shape and the other concentric buried cavities 12B-12H have an annular shape.

The concentric buried cavities 12A-12H (generically referred to as the concentric buried cavities 12 when it is not desired to distinguish them) have widths w1-w8 increasing in the radial direction, here from the central buried cavity 12A, where w1 represents the radius of the central buried cavity 12A. The concentric buried cavities 12B-12H, which may be referred to as peripheral cavities, are spaced outward in the radial direction from the central buried cavity 12A, which may be referred to as a central cavity.

According to an embodiment, the widths w1-w8 of the concentric buried cavities 12A-12H are chosen so that they have a linearly decreasing resonance frequency (see FIG. 3).

For example, w1=106 μm; w2=159 μm; w3=162 μm; w4=166 μm; w5=171 μm; w6=176 μm; w7=181 μm and w8=187 μm.

In general terms, the widths wi (e.g., w1, w2, w3, w4, w5, w6, w7, w8, etc.) of the first cavities may vary between a minimum value of 20 μm and a maximum value of 500 μm.

The concentric buried cavities 12 are mutually spaced in a uniform manner, for example by 2-20 μm.

The concentric buried cavities 12 also have a depth, e.g., of 2-20 μm, in particular of 4 μm.

The concentric buried cavities 12 are coplanar with each other and extend at a short distance from the face 11A of the body 11. For example, the distance d1 between the top side of the concentric buried cavities 12 and the face 11A of the body 11 (FIG. 6) is comprised between 1 μm and 100 μm, in particular 4 μm.

The concentric buried cavities 12A-12H delimit from below, inside the body 11, respective thin membranes 13A-13H; therefore each thin membrane 13A-13H extends between a respective concentric buried cavity 12A-12H and the face 11A of the body 11.

Figure 5:
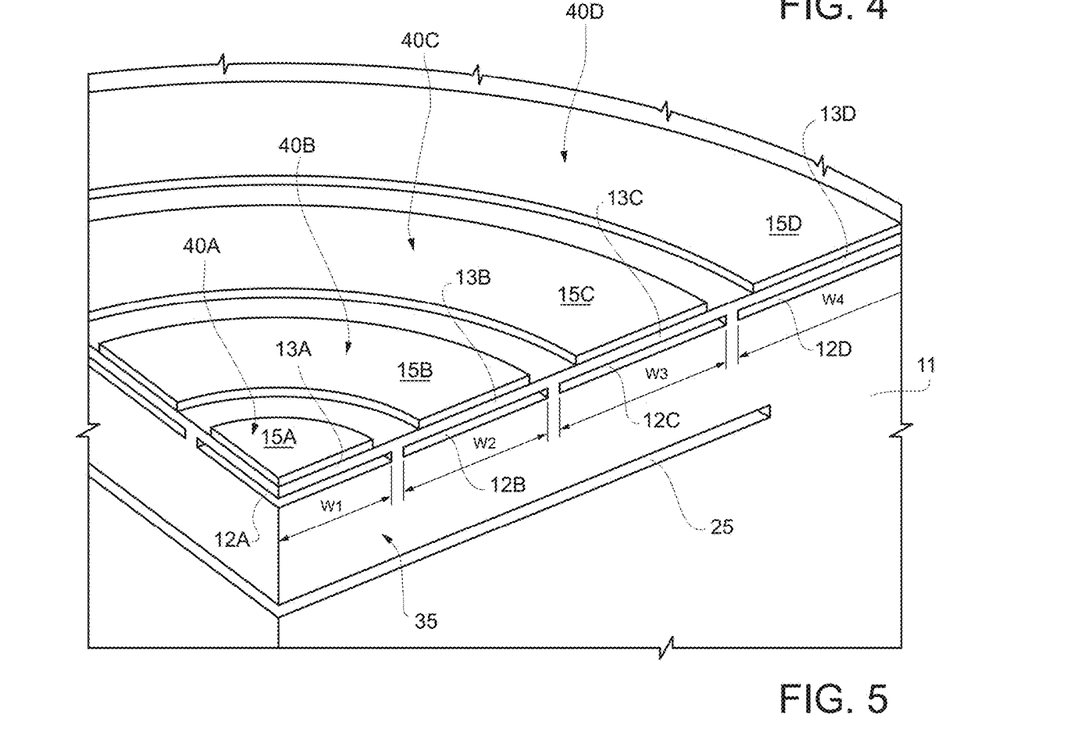
FIG. 5 shows a detail of FIG. 4.

A plurality of piezoelectric elements 15A-15H extends on the face 11A of the body 11. The piezoelectric elements 15A-15H (generically referred to as the piezoelectric elements 15 when it is not desired to distinguish them) each extend on a respective thin membrane 13A-13H (see in particular the enlarged detail of FIG. 5, showing the concentric buried cavities 12A-12C, the respective thin membranes 13A-13C and the respective piezoelectric elements 15A-15C).

The piezoelectric elements 15A-15H have a circular/annular shape similar to that of the respective concentric buried cavities 12A-12H and therefore comprise, in the embodiment shown, a piezoelectric element 15A, of circular shape and central position, also referred to as the central piezoelectric element 15A, and a plurality of piezoelectric elements 15B-15H, of annular shape and arranged concentrically with each other and with the central piezoelectric element 15A.

In practice, each piezoelectric element 15A-15H forms, with the respective concentric buried cavity 12A-12G, a transducer unit, indicated by 40A-40H.

Figure 6:
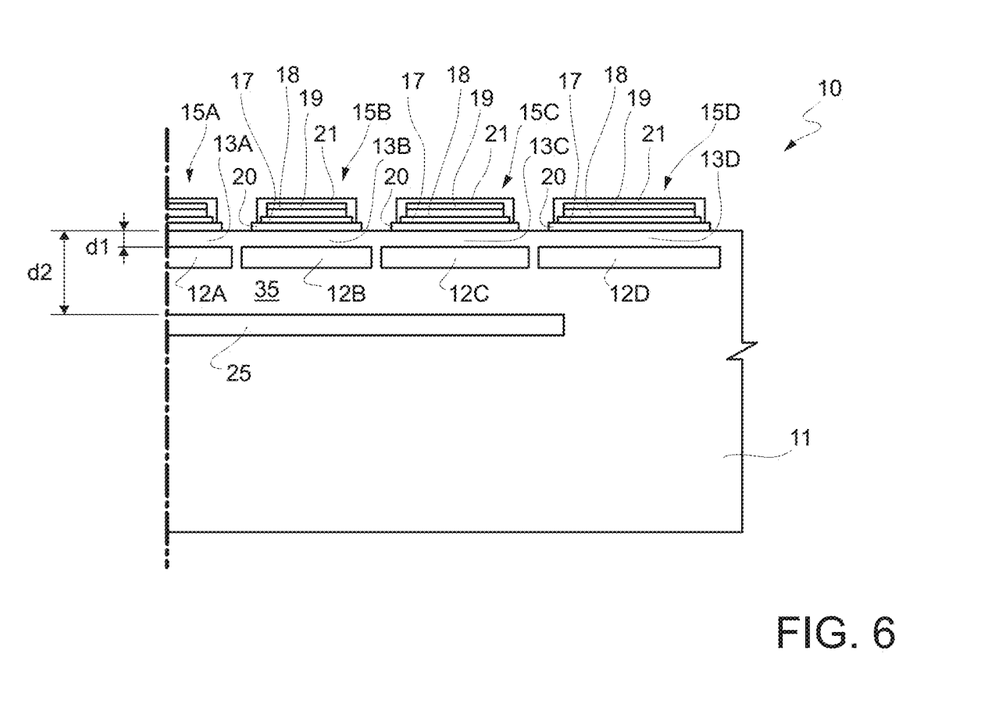
FIG. 6 is a cross-section, on an enlarged scale, of half of the acoustic transducer of FIG. 4.
Figure 7:
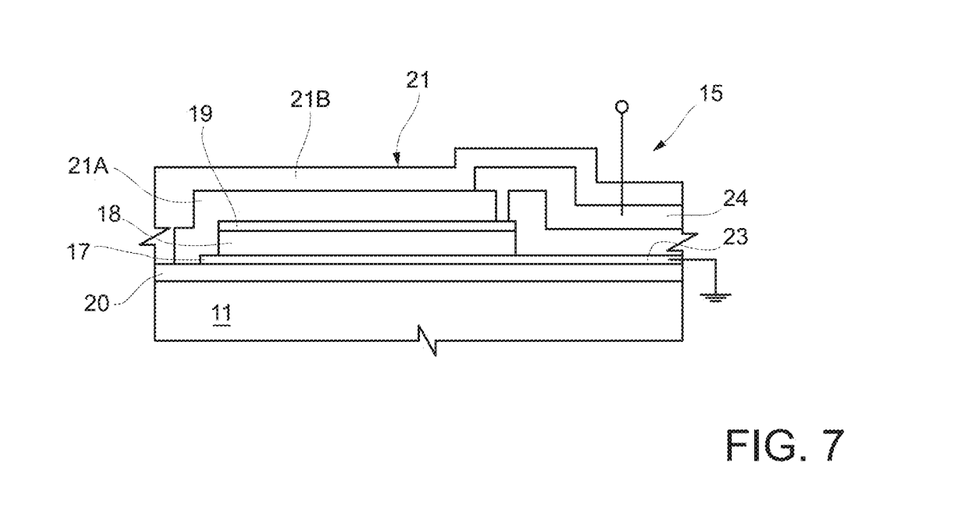
FIG. 7 is a cross-section of a detail of an annular element of the acoustic transducer of FIG. 4.

As visible in particular in FIGS. 6 and 7, each piezoelectric element 15 comprises a layer stack formed by a bottom electrode 17, a piezoelectric layer 18 and a top electrode 19 and is electrically insulated from the body 11 by an insulating layer 20.

A passivation layer 21 may cover, upwardly and laterally, the layer stacks 17-19. For example, as shown in FIG. 7, showing a detail of the electrical connection of the bottom electrode 17 and of the top electrode 19, the protection layer 21 may be formed by a double layer (first and second protection layers 21A and 21B), mutually superimposed.

The piezoelectric layer 18 may be formed, for example, by PZT (Pb, Zr, TiO3) or by other piezoelectric material, i.e., capable of transforming electrical energy into vibrational mechanical energy or vice versa.

The insulating layer 20 may be of TEOS (tetraethylorthosilicate); the bottom electrode 17 is of electrically conductive material, e.g., of titanium (Ti) or platinum (Pt); the top electrode is of electrically conductive material, e.g., of TiW; the protection layers 21A and 21B are of insulating material. For example, the first protection layer 21A may be of silicon oxide and the second protection layer 21B may be of silicon nitride deposited by CVD (Chemical Vapor Deposition).

A deep buried cavity 25 extends below some of the concentric buried cavities 12 and, precisely, of the concentric buried cavities 12 having smaller width, for the reasons explained hereinbelow. In the embodiment shown, the deep buried cavity 25 extends below the central buried cavity 12A and the two concentric buried cavities 12B, 12C adjacent thereto.

In the embodiment shown, therefore, the deep buried cavity 25 is centrally arranged and has a circular shape; for example, it may have a radius R of 550 μm (diameter of 1100 μm).

In general, the second buried cavity 25 has a diameter comprised between 500 μm and 1500 μm and a depth comprised between 100 μm and 200 μm.

Furthermore, the top surface of the deep buried cavity 25 extends at a distance d2 from the face 11A of the body 11 which is comprised between 10 μm and 200 μm, for example of 140 μm.

The deep buried cavity 25 has a depth, e.g., of 2-20 μm, in particular of 4 μm, and delimits on the bottom a thick membrane 35 having a thickness d2, in the example considered, of 140 μm.

As shown in FIGS. 6 and 7, the bottom electrode 17 and the top electrode 19 of each piezoelectric element 15 are connected to respective conductive tracks 23, 24 (also referred to as the bottom conductive track 23 and the top conductive track 24), for example formed in the same material layer as the respective electrodes 17, 19.

Figure 8:
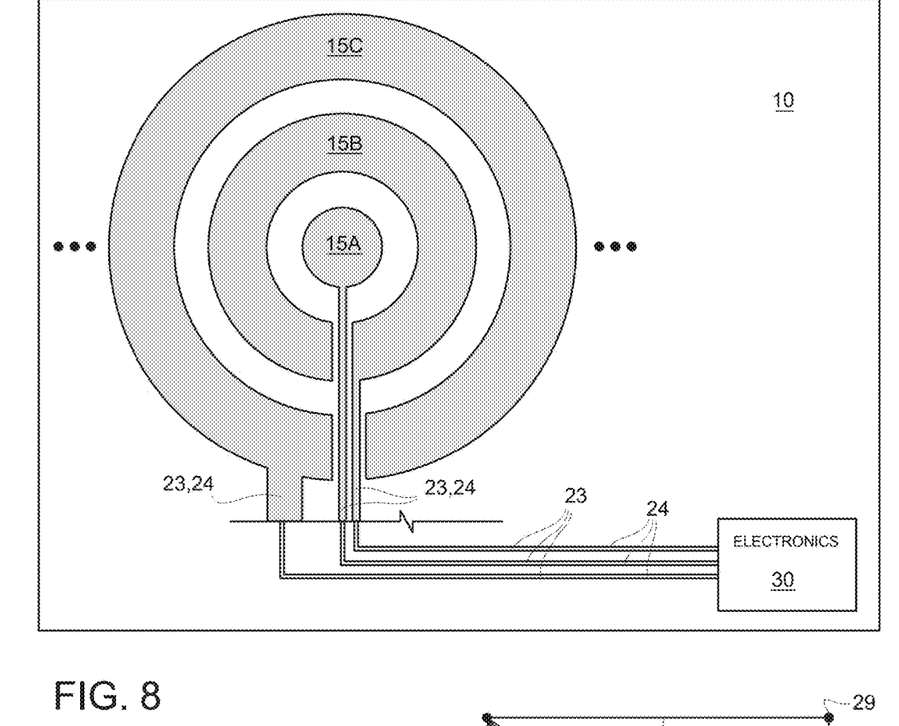
FIG. 8 is a top view of the acoustic transducer of FIG. 4.

The conductive tracks 23, 24 may be separated, for example as shown in FIG. 8. Here, in the first part of the conductive tracks 23, 24 (from the respective electrodes 17, 19) of each piezoelectric element 15, the conductive tracks 23, 24 are superimposed, so that only the top conductive track 24 is visible.

In particular, in the first part of the conductive tracks 23, 24, near the electrodes 17, 19, the conductive tracks 23, 24 of the piezoelectric elements 15A-15C (as well as of the piezoelectric elements 15D-15G, not visible) extend through interruptions in the piezoelectric elements 15 that are respectively more external.

Alternatively, FIG. 8, the bottom electrodes 17 of all the piezoelectric elements 15 may be connected to each other (for example to ground) and the top electrodes 19 of all the piezoelectric elements 15 may be connected to each other. In this case, the rings of the piezoelectric elements 15B-15H may be complete, without interruptions, and may be biased at a common biasing voltage V, for example provided by a voltage generator 28, for example external and coupled to the top conductive tracks 24 through a voltage application pad 29.

In both cases, the conductive tracks 23, 24 are connected to electronics 30 (FIG. 8).

The electronics 30 comprises, in a known manner and not shown, a power supply unit, configured to generate the biasing voltages, and a control unit, configured to control the transduction steps (acoustic wave emission and/or acoustic wave detection).

Figure 9:
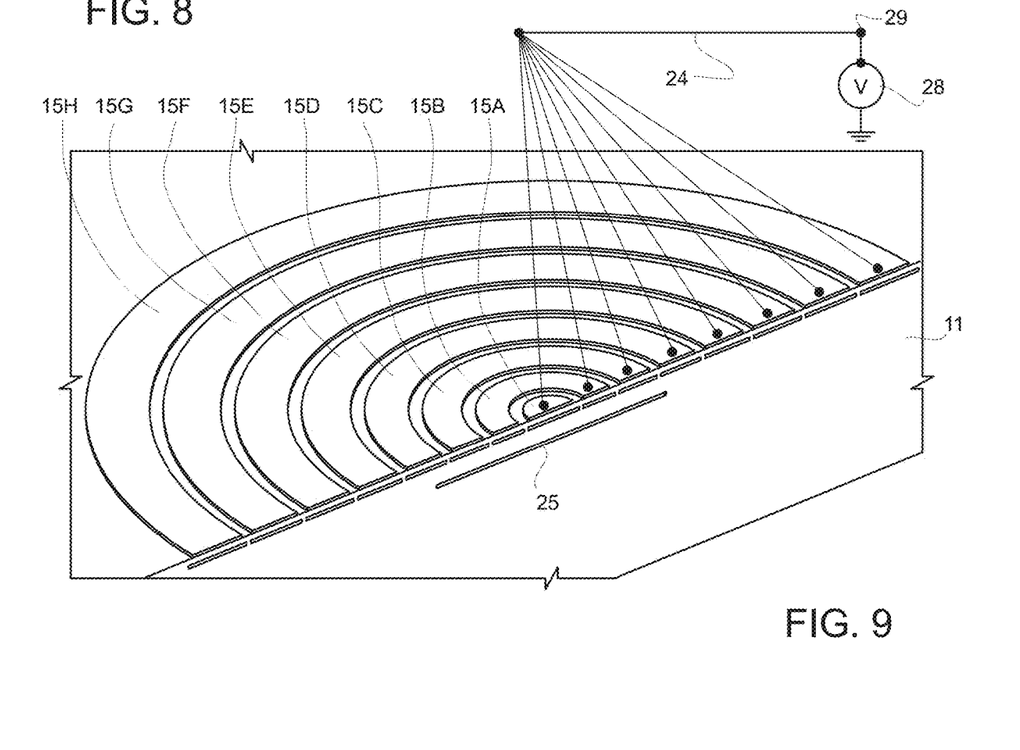
FIG. 9 is a perspective cross-section of the acoustic transducer of FIG. 4, in an electrical biasing configuration.

The electronics 30 may be integrated into the body 11 together with the acoustic transducer 10 or may be integrated in a separate die and coupled to the conductive tracks 23, 24 through pads, as shown schematically in FIG. 9.

In use, in a known manner, the application of a variable voltage, for example an alternating voltage, to the piezoelectric elements 15A-15B, causes generation of a strain and vibration of the respective thin membranes 13A-13H and emission of acoustics waves in the medium where the acoustic transducer 10 is located (acoustic wave generator operating mode).

Conversely, in the rest condition of the thin membranes 13A-13H (in presence of a DC bias or in absence of applied voltage, depending on the material of the piezoelectric layer 18), an acoustic wave hitting the thin membranes 13A-13H causes vibration of the latter and therefore the onset of a variable stress in the relative piezoelectric elements 15A-15H; these elements therefore generate corresponding electrical signals usable by the electronics 30 for detecting the parameters of the received acoustic wave (acoustic wave receiver operating mode).

The acoustic transducer 10, due to the different widths of the concentric buried cavities 12A-12G, is capable of rapidly switching from the acoustic wave emitter operating mode to the acoustic wave detector operating mode.

In fact, as discussed above, due to the different widths of the thin membranes 13A-13H, each transducer unit 40A-40H has a different resonance frequency.

For example, with the widths w1-w8 and the dimensions of the thin membranes 13A-13H indicated above, for silicon membranes, the resonance frequency values indicated in the following table I have been experimentally detected:

TABLE 1

| Width [μm] | Resonance frequency [Hz] |
| --- | --- |
| 106 (R) | 1250 |
| 159 | 1150 |
| 162 | 1100 |
| 166 | 1050 |
| 171 | 1000 |
| 176 | 950 |
| 181 | 900 |
| 187 | 850 |

Due to the different resonance frequencies of the thin membranes 13A-13H and to their adjacent arrangement, the acoustic transducer 10 has a resonance frequency comprised between the minimum frequency value (resonance frequency of the maximum width cavity, here the concentric buried cavity 12H) and the maximum frequency value (resonance frequency of the minimum width cavity, here the first cavity 12A) and therefore is broadband.

By neglecting for the moment the effect of the thick membrane 35, as a result, the acoustic transducer 10 has a reduced quality factor Q with respect to the single transducer units 40A-40G and therefore tends to rapidly damp oscillations.

This is advantageous, for example, when the acoustic transducer 10 is used as a distance meter.

In fact, in this case, the acoustic transducer 10 may be controlled to operate, in a first step, in the generator operating mode and generates a high-frequency acoustic wave and, in a second step, in the receiver operating mode, and detects the echo of the emitted acoustic wave.

To this end, in the first step, the thin membranes 13A-13H are caused to vibrate by the respective piezoelectric elements 15A-15H, but they are rapidly damped, due to the high band of the system, and are rapidly caused to rest, to be able to operate in a detection condition.

In this manner, the acoustic transducer 10 may perform distance measurement operations very rapidly, without having to wait long times between the two operating steps. As a result, it is capable of operating even at a short distance.

According to another embodiment, the transducer units 40A-40G may be controlled individually and/or in selected groups, applying control voltages only to the selected transducer unit(s) 40A-40G. This may be useful in some applications, such as for example for focusing an acoustic beam for tumor ablation in the brain.

As mentioned above, in the acoustic transducer 10, the deep buried cavity 25 allows the acoustic waves emitted at high frequency to be amplified.

In fact, the acoustic power emitted by a PMUT acoustic transducer is subject to a damping dependent on the wave frequency and on the propagation medium, according to the equation:

$$p(x,t)=Pe^{-\alpha x}\cos(\omega t-kx) \quad (1)$$

wherein:
p is the emitted acoustic power;
x is the distance from the emission plane;
t is the time;
P is the amplitude of the emitted wave;
α [Np/m, wherein Np is the Napier's number] is the amplitude attenuation coefficient, dependent on the frequency of the emitted wave and on the propagation medium;
ω is the angular frequency; and
k is the wavenumber (inverse of the wavelength).

For example, at the frequency of 1 MHz, the coefficient α has a value of 0.0022 in water and 12 in air.

In general, therefore, the waves emitted at higher frequencies are subject to greater attenuation than those at lower frequency. Furthermore, if the acoustic transducer 12 works at frequencies of the order of MHz and the propagation medium is air, the attenuation is rather high.

The deep buried cavity 25 obviates this problem. In fact, the acoustic pressure of a wave emitted by a membrane depends on the square of the ratio between the thickness and the radius of the membrane, as well as on its stiffness (Young's Modulus and on the density of the material of the membranes 13, 25, here monocrystalline silicon). By designing the thick membrane 35 so that it has a resonance frequency in the operational field of the narrower membranes 13A-13D (and where the attenuation in air is maximum), the acoustic wave emitted by the narrower membranes 13A-13D may be amplified.

For example, for a thickness of the thick membrane 35 of 140 μm (distance d2 in FIG. 6) and diameter 2R of 1.1 mm, the thick membrane 35 has a resonance frequency of 1.1 MHz and therefore acts so as to amplify the oscillations of the membranes 13A-13C/D that operate at similar frequencies.

In practice, the thick membrane 35 resonates with the overlying thin membranes 13A-13H which are actuated. Due to the large diameter of the thick membrane 35, the latter is subject to a high deformation which originates a very high acoustic pressure at a near resonance frequency, in the example considered, at 1.1 MHz. Since this frequency is inside the frequency band where the acoustic propagation is strongly attenuated by the air (or other medium which the acoustic transducer immersed in and which has strong attenuation at high-frequency), the membrane 35 contributes to making the acoustic transducer 10 operative even in such operating conditions.

Figure 10A:
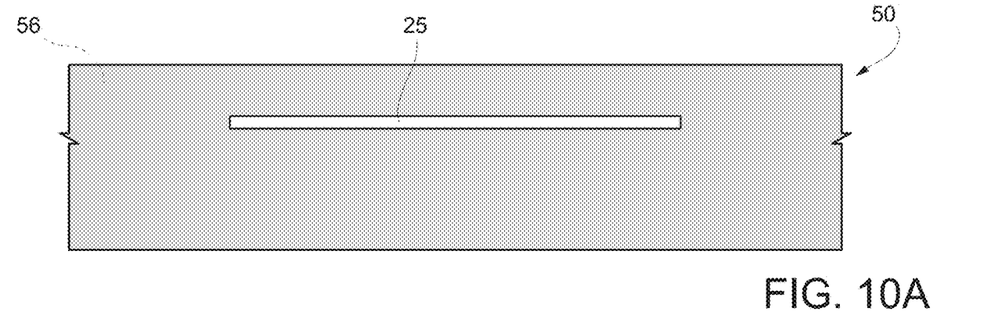
FIGS. 10A-10C are cross-sections through a wafer of semiconductor material during subsequent manufacturing steps of the acoustic transducer of FIG. 4, according to an embodiment.
Figure 10B:
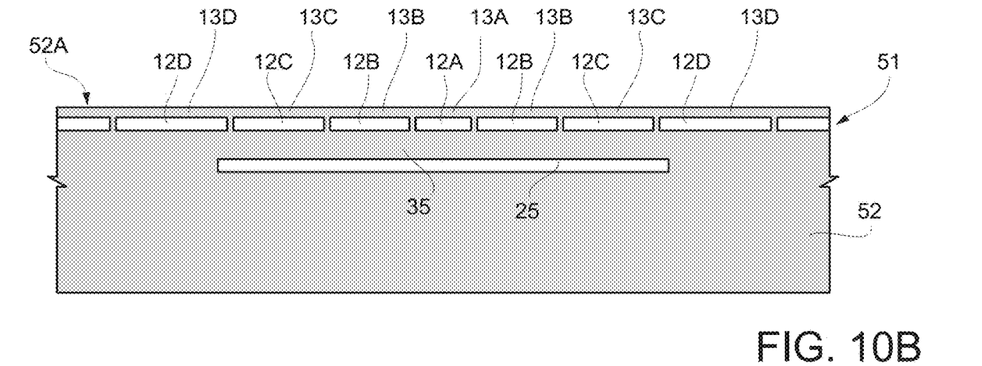
Figure 10C:
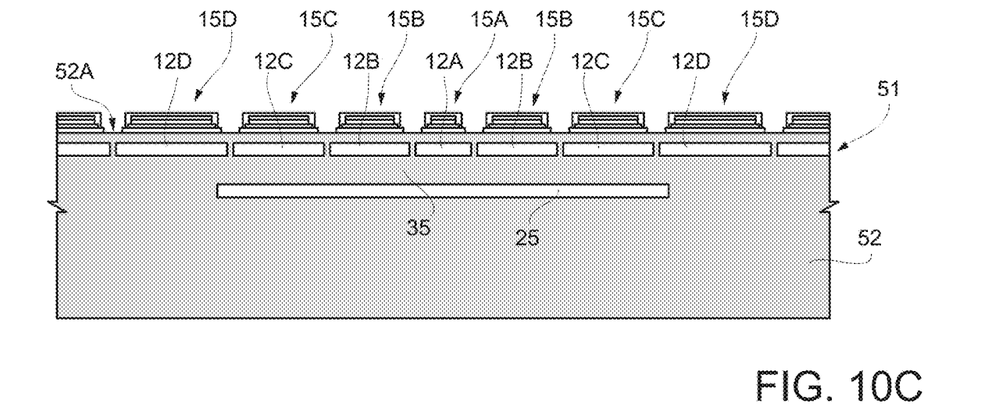

The acoustic transducer 10 may be formed as shown in FIGS. 10A-10C.

In FIG. 10A, a wafer 50 of semiconductor material, such as monocrystalline silicon, has been subject to first processing steps for forming the buried deep cavity 25.

For example, the deep buried cavity 25 may be formed with the process described in EP1577656 (corresponding to U.S. Pat. No. 8,173,513), according to which, starting from an initial silicon wafer, a plurality of adjacent and communicating trenches are formed, separated by silicon pillars; then an epitaxial growth is performed in an oxidizing environment, which leads to the top closure of the trenches and to a migration of the silicon atoms of the pillars, with formation of the buried cavity 25.

Then, FIG. 10B, the concentric buried cavities 12 (only some shown in FIG. 10B) are formed in the epitaxial layer 56 grown on the buried cavity 25, by using the same process described above.

Thus, the thin membranes 13A-13G (only some shown in FIG. 10B) and the thick membrane 35 are also formed.

The wafer thus obtained, indicated by 51, is formed by a substrate 52 (intended, after dicing the wafer 50, to form the body 11) having for example a depth of 712 μm and a face 51A.

Subsequently, FIG. 10C, the piezoelectric elements 15A-15G (only some shown) are formed on the face 52A of the substrate 52, by depositing and defining the respective layers.

After dicing the wafer 51, a plurality of acoustic transducers 10 are obtained (FIGS. 4-9).

According to another embodiment, shown in FIGS. 11A-11H, the membranes 13A-13G and 35 are of porous silicon.

Figure 11A:
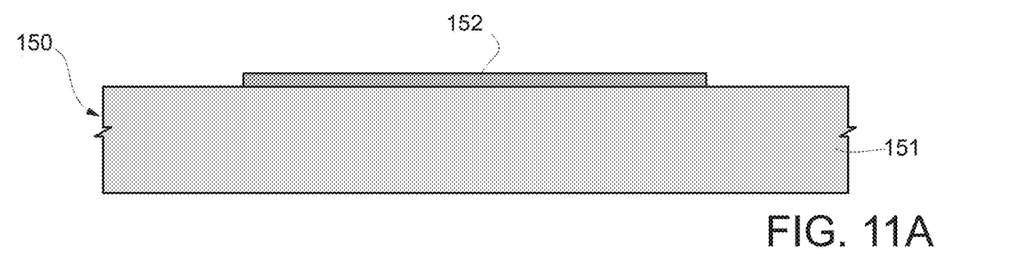
FIGS. 11A-11H are cross-sections through a wafer of semiconductor material during subsequent manufacturing steps of the acoustic transducer of FIG. 4, according to another embodiment.

In detail, with reference to FIG. 11A, a wafer 150 comprises a substrate 151 of semiconductor material, here silicon, for example monocrystalline, and a deep sacrificial region 152, thermally grown or deposited on the substrate 151. The deep sacrificial region 152 may be, for example, of silicon oxide, BPSG (Boron Phosphorous Silicon Glass) or silicon nitride.

Figure 11B:
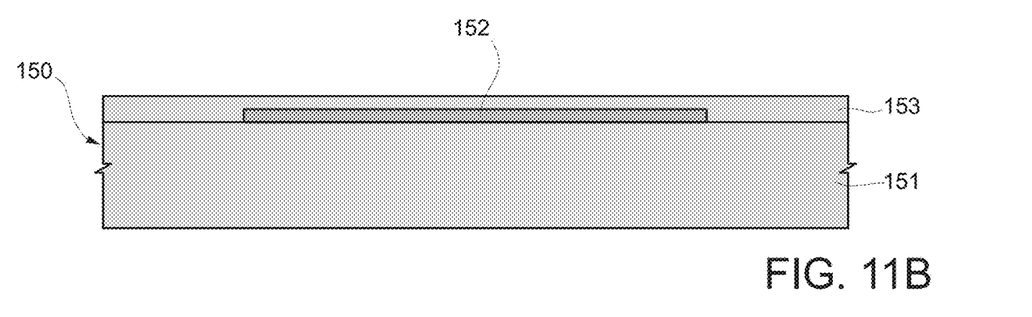

In FIG. 11B, a first structural layer 153 of porous silicon is deposited on the substrate 151 and covers the deep sacrificial region 152. For example, the first structural layer 153 may be deposited by an LPCVD (Low Pressure Chemical Vapor Deposition) process from pure silane gas, at a pressure of 550 mtorr at 600° C. The first porous silicon layer 153 may have a thickness comprised between 100 and 150 nm.

In a manner known to the person skilled in the art, the porous silicon of the first structural layer 153 is characterized by the presence of micropores which make it permeable to liquids, in particular to etchants, such as, in case of a deep sacrificial region 152 of silicon oxide, HF (hydrofluoric acid).

Figure 11C:
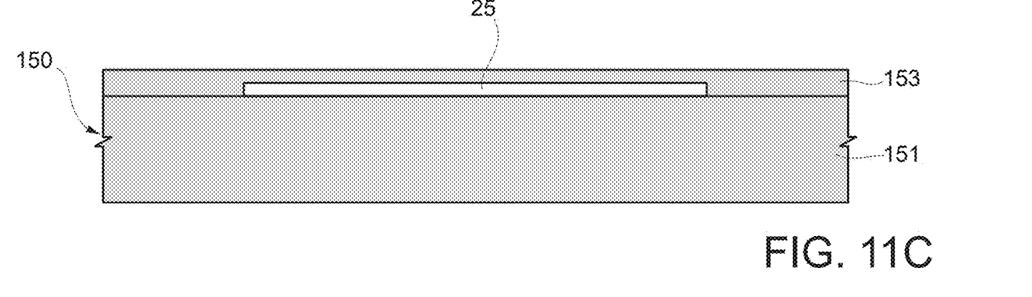

Then, FIG. 11C, the deep sacrificial region 152 is removed by HF etching through the first structural layer 153. Since this type of etching allows the removal of silicon oxide, but does not remove silicon, at the end of the etching the deep cavity 25 is formed in the wafer 150.

Figure 11D:
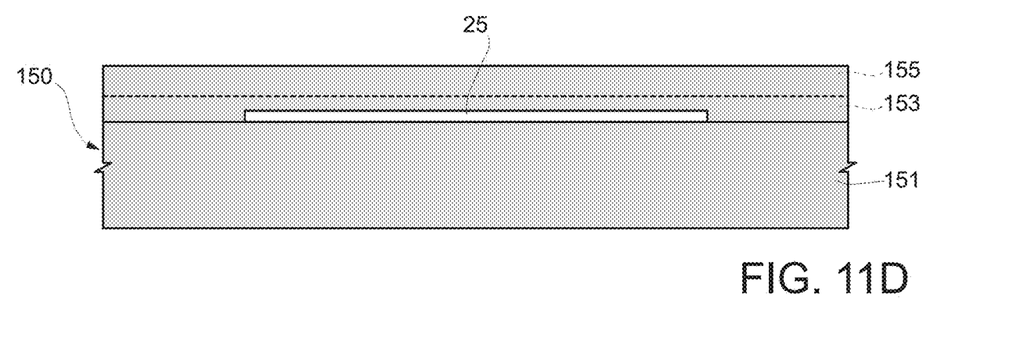

In FIG. 11D, a second structural layer 155, again of porous silicon, is deposited on the first structural layer 153. The second structural layer 155 may be deposited using the same parameters indicated above for the first structural layer 153.

The first structural layer 153 and the second structural layer 155 together form an intermediate structural layer 156, having a thickness equal to about the distance between the deep buried cavity 25 and the concentric buried cavities 12A-12H.

Figure 11E:
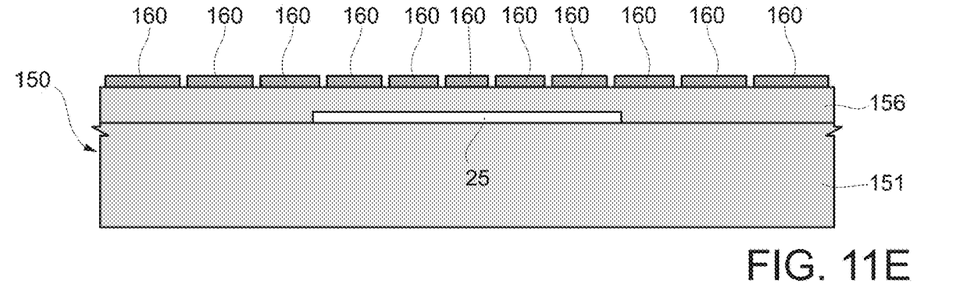

In FIG. 11E, a plurality of superficial sacrificial regions 160 (only some shown) corresponding to the concentric buried cavities 12A-12H to be formed are created on the surface of the intermediate structural layer 156. The superficial sacrificial regions 160 may be, for example, of thermally grown or deposited silicon oxide.

Figure 11F:
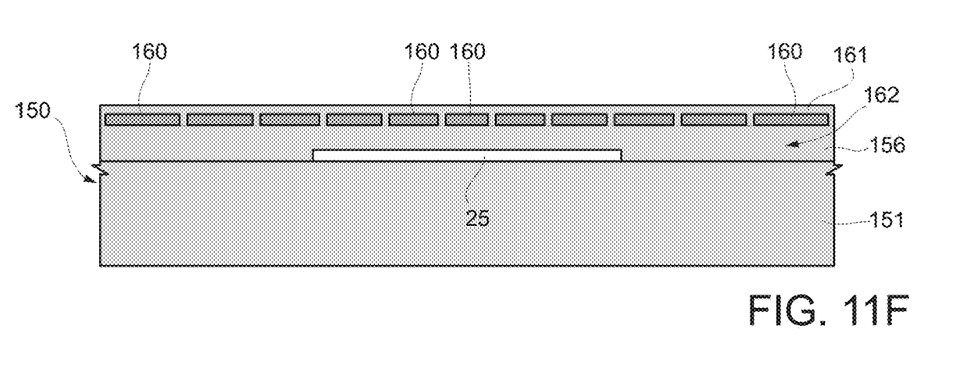

In FIG. 11F, a third structural layer 161 of porous silicon is deposited on the intermediate structural layer 156 and covers the superficial sacrificial regions 160. The third structural layer 161 may be deposited using the same parameters indicated above for the first structural layer 153 and may have thickness of about 4 µm, and in any case corresponding to the desired thickness of the thin membranes 13A-13H.

The third structural layer 156 and the intermediate structural layer 156 together form a final structural layer 162, having a thickness equal to the distance d2 (FIG. 6).

Figure 11G:
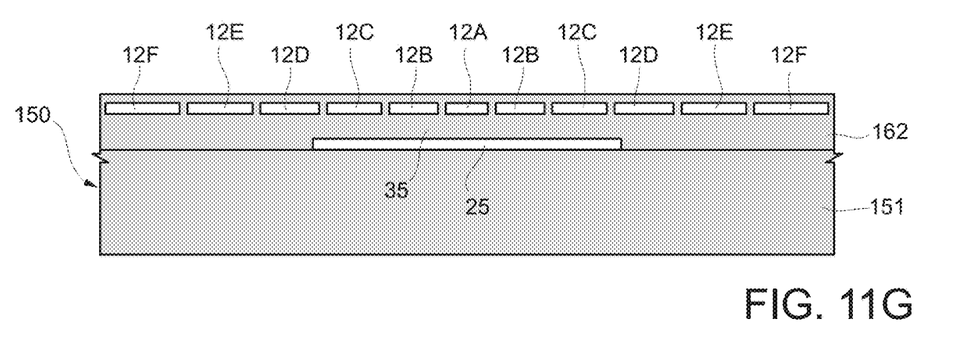

Then, FIG. 11G, the superficial sacrificial regions 160 are removed by HF etching through the third structural layer 161, forming the concentric buried cavities 12A-12G.

Figure 11H:
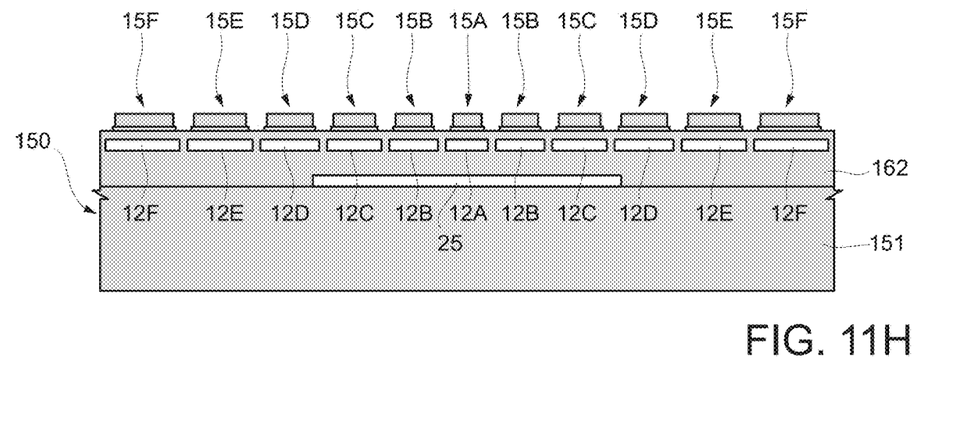

In FIG. 11H, the piezoelectric elements 15A-15G (only some of which shown) are formed, by depositing and defining the respective layers.

After dicing the wafer 151, a plurality of acoustic transducers 10 are obtained (FIGS. 4-9).

The acoustic transducer 10 and the manufacturing processes described herein have numerous advantages.

In fact, forming transducer units 40A-40H with thin membranes 13A-13G, concentric with each other and having variable dimensions, as described above, allows a multifrequency acoustic transducer, with high detection accuracy and quick response, to be obtained.

Thanks to the presence of the deep buried cavity 25, the acoustic transducer 10 is capable of emitting high-power acoustic waves, detectable at a long distance, and has high sensitivity even when operating in media having high attenuation, such as air, and high frequencies. Advantageously, this amplification occurs by exploiting the portion of the body 11 underlying the thin membranes 13A-13G, and therefore without requiring further space for forming the thick membrane 35. This contributes to maintaining the dimensions of the acoustic transducer 10 small.

By operating several transducer units 40A-40H simultaneously, wide band acoustic signals, with rapid vibration damping, may be emitted and detected.

The acoustic transducer 10 may also be manufactured using usual semiconductor technique process steps and therefore at reduced costs.

It also has small overall dimensions which allow it to be used in portable devices.

Finally, it is clear that modifications and variations may be made to the acoustic transducer and to the manufacturing process described and illustrated herein without thereby departing from the scope of the present disclosure, as defined in the attached claims.

For example, the concentric buried cavities 12A-12G may be in different number.

They may also have dimensions variable in a different manner than shown. In particular, according to a different embodiment, the cavities might have a decreasing dimension starting from the center. In this case, the deep buried cavity 25 might have an annular shape and extend below the first outermost cavities.

Or, the concentric buried cavities 12 might have variable width in groups, so that the buried cavities of each group have the same width, and each group is arranged between a first group of larger dimension cavities and a second group of smaller dimension cavities.

Alternatively, the dimension sequence of the first cavities 12 might not be monotonous, and therefore not always increasing (or decreasing, depending on the direction of observation).

The number of concentric buried cavities 12 having the deep buried cavity 25 extending therebelow may vary, in particular depending on the desired resonance frequencies.

The central buried cavity 25 might also have an annular shape.

The embodiment with porous silicon of FIGS. 11A-11H might not include the formation of the second structural layer 155, also depending on the thickness of the first structural layer 151 and on the desired thickness of the thick membrane 35.

A PMUT acoustic transducer (10), may be summarized as including a body (11) of semiconductor material having a face (11A); a plurality of first buried cavities (12A-12H), having an annular shape, arranged concentrically to each other and extending at a distance from the face (11A) of the body (11); a plurality of first membranes (13A-13H) formed by the body (11), each first membrane (13A-13H) extending between a respective first buried cavity (12A-12H) of the plurality of first buried cavities and the face (11A) of the body (11); a plurality of piezoelectric elements (15A-15H) on the face of the body, each piezoelectric element extending above a respective first membrane (13A-13H) of the plurality of first membranes; wherein the first membranes (13A-13H) have different widths (w1-w8).

The plurality of first membranes (13A-13H) may include a central membrane (13A) surrounded by other first membranes (13B-13H) of the plurality of first membranes (13A-13H) and a peripheral membrane (13H) surrounding the other first membranes of the plurality of first membranes and wherein the first membranes (13A-13H) of the plurality of first membranes have widths (w1-w8) that are monotonously variable from the central membrane (13A) towards the peripheral membrane (13H).

The first membranes (13A-13H) of the plurality of first membranes may have widths (w1-w8) increasing from the central membrane (13A) towards the peripheral membrane (13H).

The first buried cavities (12A-12H) may extend at a first distance (d1) from the face (11A) of the body (11) and the PMUT acoustic transducer (10) may further include a second buried cavity (25) extending at a second distance (d2) from the face of the body, the second distance greater than the first distance (d1), the second buried cavity (25) extending below at least one minimum width membrane (13A) of the plurality of first membranes (13A-13H).

The second buried cavity (25) may extend below at least the central membrane (13A).

The second buried cavity (25) may have a diameter between 500 μm and 1500 μm.

The second distance (d2) may be between 10 μm and 200 μm.

The first membranes may have a variable width between a minimum value and a maximum value, the minimum value (w1) being less than or equal to 20 μm and the maximum value (w8) being greater than or equal to 500 μm.

The first buried membranes (13A-13H) may have a thickness (d1) between 1 μm and 100 μm.

The piezoelectric elements (15A-15H) of the plurality of piezoelectric elements each may include a first and a second electrode (17, 19), the first electrodes (17) of the piezoelectric elements (15A-15H) of the plurality of piezoelectric elements being mutually coupled and the second electrodes (19) of the piezoelectric elements of the plurality of piezoelectric elements being mutually coupled.

The piezoelectric elements (15A-15H) of the plurality of piezoelectric elements each may include a first electrode (17) and a second electrode (19), the second electrodes (19) of the piezoelectric elements (15A-15H) of the plurality of piezoelectric elements being mutually decoupled.

A process for manufacturing a PMUT acoustic transducer (10), may be summarized as including forming a plurality of first buried cavities (12A-12H) in a wafer (50; 150) of semiconductor material, the first buried cavities being arranged concentrically to each other and extending at a distance from the face (52A) of the first wafer (50; 150), the first buried cavities (12A-12H) defining a plurality of first membranes (13A-13H) each extending between a respective first buried cavity (12A-12H) of the plurality of first buried cavities and the face (52A) of the body (50; 150); and forming a plurality of piezoelectric elements (15A-15H) on the face (52A) of the body (50; 150), each piezoelectric element extending above a respective first membrane (13A-13H) of the plurality of first membranes; wherein the first membranes (13A-13H) have different widths (w1-w8).

The process may further include forming a second buried cavity (25), wherein the first buried cavities (12A-12H) extend at a first distance (d1) from the face (52A) of the body (50; 150) and the second buried cavity (25) extends at a second distance (d2) from the face of the body, below at least one first minimum width membrane (13A) of the plurality of first membranes (13A-13H), the second distance greater than the first distance (d1).

After forming the second buried cavity (25), a semiconductor material layer (56; 155) may be grown epitaxially; and the step of forming the plurality of first buried cavities (12A-12H) may be performed.

Forming the second buried cavity (25) may include forming a first sacrificial region (152) of material other than the semiconductor material and etchable by an etching solution ineffective on the semiconductor material; forming a first porous semiconductor material layer (153) covering the first sacrificial region (152); removing the first sacrificial region through the first porous semiconductor material layer (153); forming a plurality of second sacrificial regions (160) on the first semiconductor material layer (155), the second sacrificial regions (160) being of material other than the semiconductor material and etchable by an etching solution ineffective on the semiconductor material; forming a second porous semiconductor material layer (161) covering the second sacrificial regions (160); and removing the second sacrificial regions through the second porous semiconductor material layer.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A device, comprising:
 a Piezoelectric Micromachined Ultrasonic Transducer (PMUT) acoustic transducer including:
  a body of semiconductor material having a face;
  a plurality of first buried cavities, having an annular shape, arranged concentrically to each other and extending at a distance from the face of the body;
  a plurality of first membranes formed by the body, each first membrane extending between a respective first buried cavity of the plurality of first buried cavities and the face of the body;
  a plurality of piezoelectric elements on the face of the body, each piezoelectric element extending above a respective first membrane of the plurality of first membranes;
  wherein the first membranes have different widths.

2. The device according to claim 1, wherein the plurality of first membranes comprise a central membrane surrounded by other first membranes of the plurality of first membranes and a peripheral membrane surrounding the other first membranes of the plurality of first membranes and wherein the first membranes of the plurality of first membranes have widths that are monotonously variable from the central membrane towards the peripheral membrane.

3. The device according to claim 2, wherein the first membranes of the plurality of first membranes have widths increasing from the central membrane towards the peripheral membrane.

4. The device according to claim 1, wherein the first buried cavities extend at a first distance from the face of the body and the PMUT acoustic transducer further comprises a second buried cavity extending at a second distance from the face of the body, the second distance greater than the first distance, the second buried cavity extending below at least one minimum width membrane of the plurality of first membranes.

5. The device according to claim 4, wherein the second buried cavity extends below at least the central membrane.

6. The device according to claim 5, wherein the second buried cavity has a diameter comprised between 500 μm and 1500 μm.

7. The device according to claim 5, wherein the second distance is comprised between 10 μm and 200 μm.

8. The device according to claim 1, wherein the first membranes have a variable width between a minimum value and a maximum value, the minimum value being less than or equal to 20 μm and the maximum value being greater than or equal to 500 μm.

9. The device according to claim 1, wherein the first buried membranes have a thickness comprised between 1 µm and 100 µm.

10. The device according to claim 1, wherein the piezoelectric elements of the plurality of piezoelectric elements each comprise a first and a second electrode, the first electrodes of the piezoelectric elements of the plurality of piezoelectric elements being mutually coupled and the second electrodes of the piezoelectric elements of the plurality of piezoelectric elements being mutually coupled.

11. The device according to claim 1, wherein the piezoelectric elements of the plurality of piezoelectric elements each comprise a first electrode and a second electrode, the second electrodes of the piezoelectric elements of the plurality of piezoelectric elements being mutually decoupled.

12. A method, comprising:
forming a Piezoelectric Micromachined Ultrasonic Transducer (PMUT) acoustic transducer including:
forming a plurality of first buried cavities in a wafer of semiconductor material, the first buried cavities being arranged concentrically to each other and extending at a distance from the face of the first wafer,
the first buried cavities defining a plurality of first membranes each extending between a respective first buried cavity of the plurality of first buried cavities and the face of the body; and
forming a plurality of piezoelectric elements on the face of the body, each piezoelectric element extending above a respective first membrane of the plurality of first membranes;
wherein the first membranes have different widths.

13. The method according to claim 12, further comprising forming a second buried cavity, wherein the first buried cavities extend at a first distance from the face of the body and the second buried cavity extends at a second distance from the face of the body, below at least one first minimum width membrane of the plurality of first membranes, the second distance greater than the first distance.

14. The method according to claim 12, wherein, after forming the second buried cavity, a semiconductor material layer is grown epitaxially; and the step of forming the plurality of first buried cavities is performed.

15. The method according to claim 14, wherein forming the second buried cavity comprises forming a first sacrificial region of material other than the semiconductor material and etchable by an etching solution ineffective on the semiconductor material; forming a first porous semiconductor material layer covering the first sacrificial region; removing the first sacrificial region through the first porous semiconductor material layer; forming a plurality of second sacrificial regions on the first semiconductor material layer, the second sacrificial regions being of material other than the semiconductor material and etchable by an etching solution ineffective on the semiconductor material; forming a second porous semiconductor material layer covering the second sacrificial regions; and removing the second sacrificial regions through the second porous semiconductor material layer.

16. A device, comprising:
a body of semiconductor material having a face;
a plurality of annular buried cavities in the body of the semiconductor material, each annular buried cavity of the plurality of annular buried cavities is concentric with each other, and the plurality of annular buried cavities is at a first level within the body;
a plurality of annular piezoelectric elements on the face of the body, each one of the annular piezoelectric elements of the plurality of annular piezoelectric elements overlaps a corresponding annular buried cavity of the plurality of annular buried cavities;
a round piezoelectric element on the face of the body and surrounded by the plurality of annular piezoelectric elements;
a first round buried cavity in the body of the semiconductor material, the first round buried cavity overlaps the round piezoelectric element, and the first round buried cavity is at the first level within the body; and
a second round buried cavity in the body of the semiconductor material, the second round buried cavity overlaps the first round buried cavity and at least one annular buried cavity of the plurality of annular buried cavities, and the second round buried cavity is at a second level within the body different from the first level.

17. The device of claim 16, wherein the first level is in closer to the face of the body relative to the second level.

18. The device of claim 16, wherein the second round buried cavity overlaps the second round buried cavity and overlaps at least two annular buried cavities of the plurality of annular buried cavities.

19. The device of claim 16, further comprising:
a plurality of annular membranes between the face of the body and a corresponding annular buried cavity of the plurality of annular buried cavities; and
a round membrane between the first round buried cavity and the round piezoelectric element.

20. The device of claim 16, wherein the plurality of annular membranes and the round membrane have different widths relative to each other, respectively.

* * * * *